United States Patent

[11] 3,601,877

[72] Inventor Carl C. Goosen
    Winter Park, Fla.
[21] Appl. No. 2,189
[22] Filed Jan. 12, 1970
[45] Patented Aug. 31, 1971
[73] Assignee Lancer Scientific Corporation
    Orlando, Fla.

[54] METHOD FOR MAKING PROSTHETIC CARDIAC VALVE
22 Claims, 21 Drawing Figs.

[52] U.S. Cl. .................................................. 29/157.1 R,
    3/1, 3/DIG. 3
[51] Int. Cl. ....................................................... B21d 53/00,
    B21k 29/00, B23p 15/26
[50] Field of Search............................................ 29/157.1 R,
    453, 469; 3/1 A, 1.2, 3, DIG. 3

[56] References Cited
UNITED STATES PATENTS
| | | | |
|---|---|---|---|
| 3,451,067 | 6/1969 | Jordan............................ | 3/1 |
| 3,491,376 | 1/1970 | Shiley............................ | 29/157.1 |
| 3,503,079 | 3/1970 | Smith............................ | 3/1 |
| 3,551,913 | 1/1971 | Shiley............................ | 3/DIG. 3 |

OTHER REFERENCES
" Prosthetic Replacement of the Mitral Valve" The Lancet 11/24/62 Pg. 1087– 1089

Primary Examiner—John F. Campbell
Assistant Examiner—Donald P. Rooney
Attorney—Duckworth and Hobby ABSTRACT: A method for making a heart valve of the type having a frame with a ring member adapted for attaching a sewing ring and having a seat for a valve element and either one or two extending arms, each arm having smaller rings on their extremities and being aligned with the center axis of the main ring. The valve element for an aorta valve has protrusions for extending through the smaller rings to either side of main ring and a portion adapted for sitting in the seat which is a section of a sphere less than a hemisphere on one side and a truncated cone on the other. The mitral valve has a generally lenticular shaped member with a T-shaped protrusion extending therefrom for passing through a smaller ring. Several embodiments of the method are provided to produce a high-quality valve utilizing commercially available tubing in one embodiment, sheet material for stamping in another embodiment and bar stock in a third embodiment.

PATENTED AUG 31 1971

CARL C. GOOSEN
INVENTOR.

BY Duckworth & Hobby

Attorneys

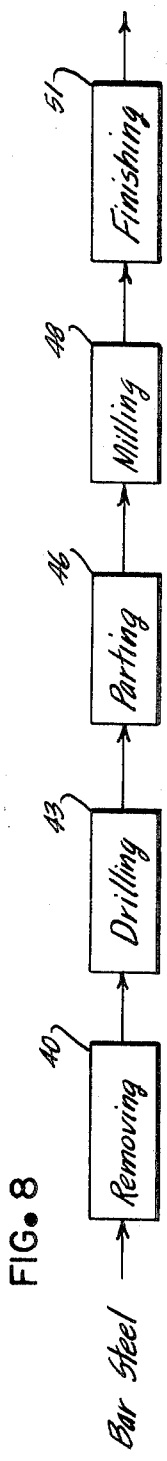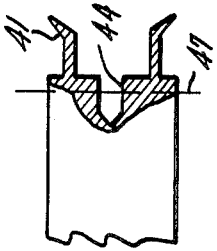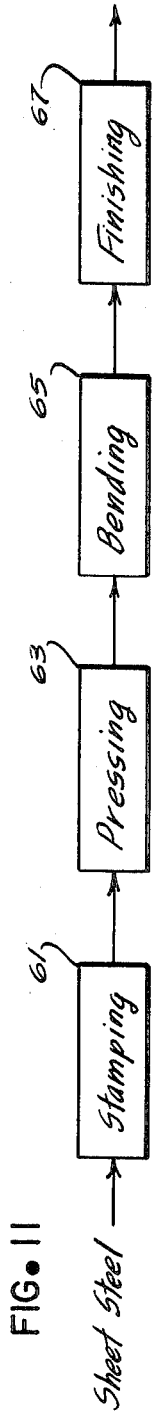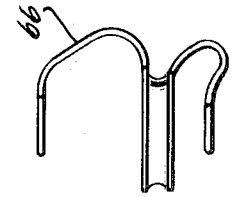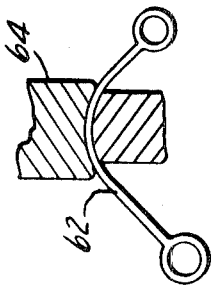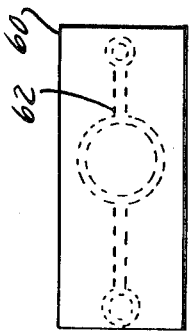

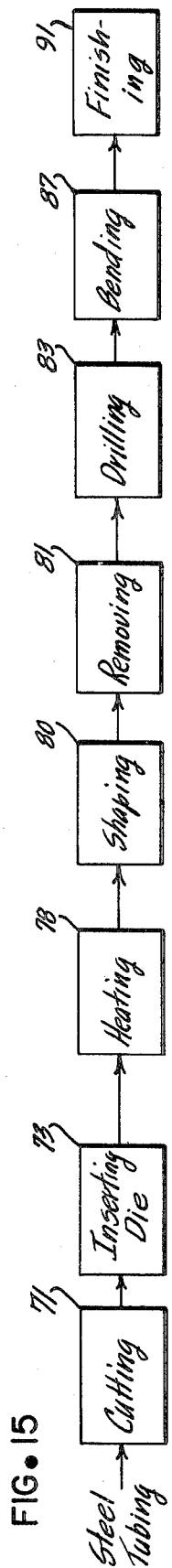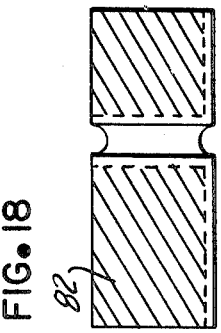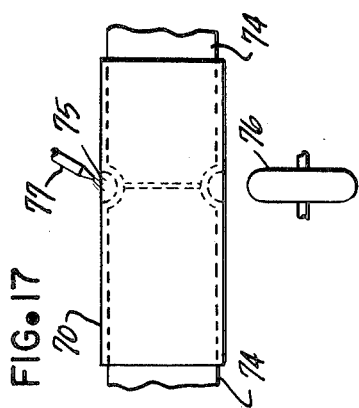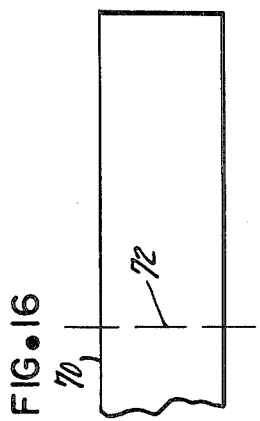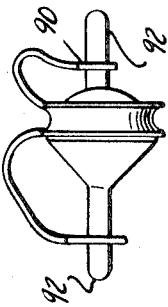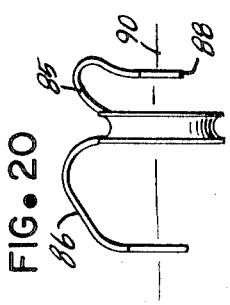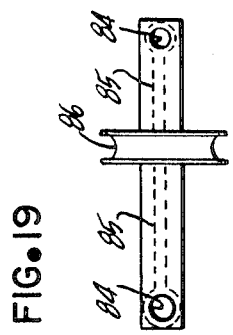

METHOD FOR MAKING PROSTHETIC CARDIAC VALVE

BACKGROUND OF THE INVENTION

The present invention relates to prosthetic cardiac valves for replacement of diseased aortic and mitral valves and more particularly to a method for manufacturing aortic and mitral valves of a type having protrusions from a check member riding in rings extending on arms from the valve seat. The earliest prosthetic aortic and mitral heart valves used clinically were the ball-in-cage design, similar in design to standard check valves used with other fluids and having a ring for attaching a sewing ring for sewing the valve into position in the patient's heart. These particular valves have been successfully used for many years. However, the disadvantages of this type of valve led to research in design of other types of valves. Two of the main disadvantages were that the relationship of a sphere or ball to the main ring diameter impeded the blood flow by the ball within the artery restricting the orifice size that could be obtained and also the disadvantage of having the cage to impede the flow of the blood. That is to say the ball has to have a diameter of between 30 and 35 percent greater than the ring to avoid impaction and in the case of a mitral valve the small ventricle which often accompanies a mixed lesion of mitral incompetence and mitral stenosis, or pure calcific stenosis, the cage makes physical contact with the myocardium. This traumatizes the myocardium and contact with the interventricular septum may trigger off ectopic beats, resulting in arrythmias which may lead to fatal ventricular fibrillation. Physical contact of the cage with the myocardium may cause the cage to lever off the suture line which attempts to overcome this fault by selecting a smaller prosthesis may result in an excessive pressure gradient across the prosthesis. Also in patients with a mixed valvular lesion of aortic incompetence and stenosis, or pure calcified stenosis the small annulus creates a need for a prosthetic device with an improved blood flow past the check element of the valve and with less obstruction by the cage. In order to overcome the problems with the ball-in-cage type heart valve, one of the valves developed provided a ring for attaching a sewing ring and seat for the check valve and having one or two arms extending from one or both sides of the ring with each arm having a small ring on the end thereof which bends around to be centered on the axes passing through the center of the ring and having an extension or protrusion extending through the small ring at the end of the arm for guiding the check elements in an opening and closing and to limit its movement when opening, the mitral valve having one arm extending on one side while the aorta valve having a pair of arms, one extending on either side of the main ring. The mitral valve is a generally lenticular shaped poppet element having a T-shaped protrusion extending from the center thereof through the main ring and hooked into the smaller ring with the cross or transverse portion of the T preventing the check element from escaping and limiting its movement, while the aorta check member has a protrusion from either end passing through the small rings on the end of each arm for guiding check member and limiting its movement. The check member in the aorta has a portion of a sphere less than a hemisphere for seating in the main ring and seat and a truncated cone connected to the other side, the portion of a sphere being faced into the flow and also adapted to fit the seat of the main ring. These advanced type of heart valves have generally been hand fashioned for experimental testing and the present invention relates to a method for manufacturing these advanced valved in larger quantities while reducing the overall cost and maintaining the high standards of quality necessary in a prosthetic cardiac valve.

Other types of valves for use in replacing diseased mitral and aortic valves have also been suggested in the past. For instance, it has been suggested to use various types of flaps hinged or held in various ways and adapted for flapping open and closed. These types of valves however have not been generally robust or sufficiently sturdy for more generalized use. It has also been suggested to make a toroidal check element hart valve as well as a valve formed of resilient spirals of conical shape which are held on the annular base and overlap each other so as to form a sealed cone blockage in one direction of blood flow and angular openings in the other direction of blood flow. Finally, methods of making anatomical check valves have also been suggested. One such method includes coating with silicone rubbers in liquid condition and curing, or another illustrates the using of a three-part clamp held by a screw clamp on the valve body for anchoring the fabric material to the valve body during assembly.

Summary of the Invention

A method for making prosthetic cardiac valves for replacement of diseased heart valves is provided. Aorta and mitral prosthetic cardiac valves are made and the aorta is the type having a frame having a main grooved ring with a seat for a check element on it and having arms extending from both sides of the ring, each arm having a smaller guide ring on its extremity and each arm being bent so that its ring is generally centered along the axis of the main ring of the frame. The valve or check element has a pair of protrusions extending from either end for passing through the guide ring for guiding the movement of the element and has a seat which is formed from a portion of a sphere less than a hemisphere which is connected to a truncated cone. One protrusion extends from the end of the truncated cone while the other extends from the center portion of the sphere seat. The mitral valve also has a grooved ring for attaching a sewing ring and one arm extending from the grooved ring and also has a smaller guide ring on its extremity. The arm is bent so that the axis of the two rings line up. The check member of the mitral valve is lenticular shape with a T-shaped protrusion extending from one side and passing through the main ring and also through the smaller guide ring where it is movably held by the cross portion of the T of the protrusion.

Several embodiments of the method are provided, one of which includes starting with a stainless steel tubing, cutting the tubing to a predetermined length, and then inserting a pair of dies each having a waist into the tubing, one from either end. The shaping of the tubing then takes place by rotating the tubing against a wheel while heating the portion directly over the waist of the dies inside the tubing. Thus, the tubing is shaped the same as the die with an annular groove located between the ends of the tubing. Portions of the tubing wall are removed, such as by cutting with a bandsaw and shaped so as to form one arm from one side or one arm on each side and drilling holes in the end of each arm to provide a small ring. The arms are then bent to align their axes passing through the hole in the ring with the axes passing through the center of the annular grooved portion. The frame may then be polished, as desired, and a valve or check element is formed of flexible material such as silastic inserted into the frame with each protrusion from the valve element being inserted through one of the guide rings. The stainless steel frame may be coated with a material, such as Teflon, and a sewing ring may be attached to the grooved annular ring.

A second method provides for starting with a solid bar of stainless steel, removing portions from the end to form a hollow annular groove on one end of the bar, and drilling a bore along the axis of the hollow annular groove, parting the end of the material having the annular groove, and milling portions away to form an annular grooved ring with an arm extending therefrom and having a guide ring formed around the previously drilled bore, with each of the rings being aligned along a single axis, then radiusing and polishing as necessary. This valve may also be coated such as with Teflon, or the like, and sewing ring connected to the annular groove for attaching to the heart. The valve element is formed of flexible material in a generally lenticular shape with a T-shaped protrusion for inserting through the big ring and through the guide ring where it is movably held by the T-bar.

Finally, the valve may be made by stamping a main ring having one or two arms with a smaller ring on the end of each arm from a sheet of stainless steel, then pressing the main ring to form a sheet of stainless steel, then pressing the main ring to form an annular groove in a valve seal therein and bending each arm to align each smaller guide ring along an axis passing through the center of the main ring, then radiusing and polishing as needed to form the frame for the valve. The valve may also be coated with a material, such as Teflon, and a valve element may be formed as previously indicated and inserted in the frame to produce the heart valve. The methods generally provide a way of manufacturing a high quality heart valve utilizing commercially available materials in an economical production process.

BRIEF DESCRIPTION OF THE DRAWINGS

Other objects, features and advantages of this invention will be apparent from a study of the written description and the drawings, in which:

FIG. 8 illustrates a flow diagram of a method in accordance with the present invention for a mitral valve frame;

FIG. 9 illustrates how material is removed from bar stock and the method in accordance with FIG. 6;

FIG. 10 illustrates an end view of the completed valve frame of 6 and 7;

FIG. 11 illustrates a flow diagram of one embodiment of a method for making an aortic heart valve frame;

FIG. 12 shows a piece of sheet steel with a pattern to be stamped therefrom;

FIG. 13 illustrates the forming of a cutout from FIG. 10;

FIG. 14 illustrated the bending of the frame from steps in FIGS. 10 and 11;

FIG. 15 illustrates a flow diagram in accordance with a second preferred embodiment of a method for making an aortic heart valve frame;

FIG. 16 illustrated one step of the process in accordance with FIG. 13;

FIG. 17 illustrates a second step in accordance with the process of FIG. 13;

FIG. 18 illustrates yet another step in the process of FIG. 13;

FIG. 19 illustrates a step in the process of FIG. 13;

FIG. 20 illustrates a step in the process of FIG. 13;

FIG. 21 illustrates yet a final step in the process in accordance with the method of FIG. 13.

DESCRIPTION OF THE PREFERRED EMBODIMENT

Figure 1:
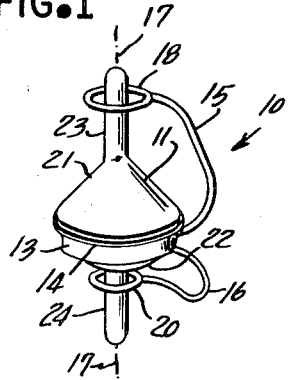
FIG. 1 is a perspective view of an aortic heart valve.

Referring now to FIG. 1 there can be seen a prosthetic cardiac valve for replacement of the diseased aortic heart valve 10 having a valve or check element 11, a frame 12 with a main ring portion 13 and a seat 14 and having arms 15 and 16 extending from opposite sides of the ring 13. The arms 14 and 15 are each curved inwardly toward center axis 17 which passes through the center of the main ring 13. Arm 15 has a similar guide ring 18 located at its extremity with the opening in the guide ring 18 being centered on the axis 17 and arm 16 has a guide ring 20 at its extremity with the opening in rings 20 being centered on the axis 17 from the opposite side of the main ring 13 from the guide ring 18. The check element 11 has a truncated cone 21 forming a portion thereof, with a large portion of the cone connecting into a portion of a sphere 22 which portion is less than a hemisphere. An arm 23 protrudes from a narrow portion of truncated cone 21 and passes through the guide ring 18 while an arm 24 protrudes from the center of a portion of the sphere through guide ring 20. Thus, it can be seen that when the valve 10 is in place, fluid flowing along the axis 17 will pass along protrusion 24 through the main ring 13 forcing check element 11 to move along axis 17 until the cone 21 comes into contact with the ring 18. Similarly, when the blood attempts to flow in the opposite direction, the valve element 11 will be forced in the opposite direction and will be stopped by the seat 14 thus preventing fluid from passing in this direction.

Figure 2:
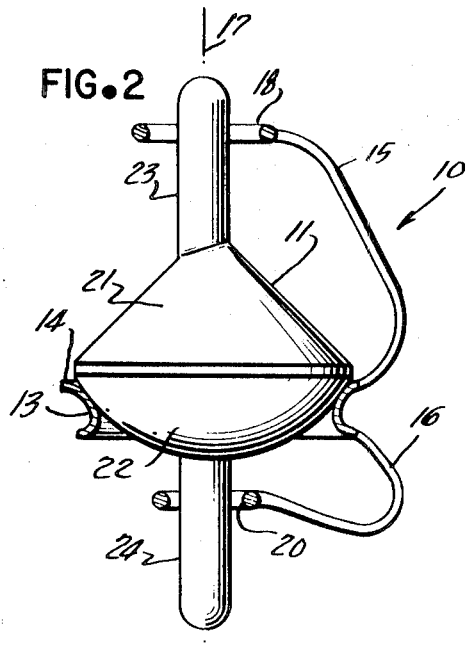
FIG. 2 is a vertical section through the valve of FIG. 1.

FIG. 2 illustrates aortic heart valve 10 having main ring 13, which can be seen as having annular grooves forming a circle and having a seat 14 for the portion of a sphere 22 of check element 11 and being connected to truncated cone 21 which has a protrusion 22 extending along axis 17 and through ring 18, while the portion of a sphere 22 protrusion 24 extends through guide ring 20 attached to arm 16. Ring 18 is attached to arm 15.

Figure 3:
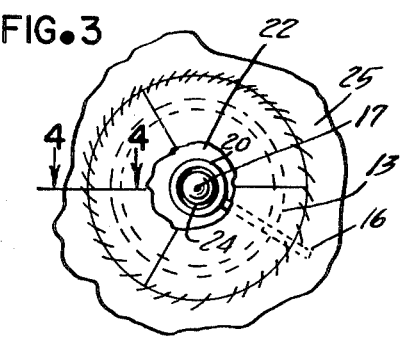
FIG. 3 is a bottom plan view with parts broken away of the valve of FIGS. 1 and 2 shown attached to a heart.

In FIG. 3, a bottom plan view showing the valve attached to the heart and having axis 17 centered on protrusion 24 which is in turn connected to the portion of a sphere 22 seated in ring 13 which in turn has been sewed to heart 25.

Figure 4:
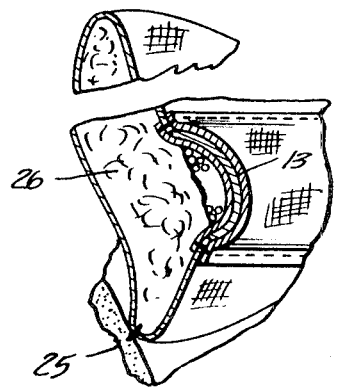
FIG. 4 is a sectional view taken on the line 4—4 of FIG. 3 illustrating the method of covering the heart valve with fabric and attaching the valve to the heart walls.

FIG. 4, taken along line 4—4, shows the sewing ring 26 connected to the heart 25 and to ring 13 for attaching the valve 10 in place.

Figure 5:
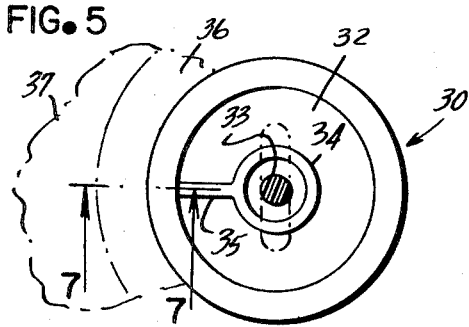
FIG. 5 is a top plan view of a mitral heart valve with parts broken away and showing a portion of the fabric cover and a portion of the area to which the valve is attached in dotted lines.

FIG. 5 shows a second embodiment of a prosthetic cardiac valve for replacement of a diseased mitral heart valve 30 and having a ring 31 in a generally lenticular-shaped valve element or check 32 which has a T-shaped protrusion 33 extended from the center thereof and passing through a guide and holding ring 34 which in turn is connected by arm 35 to the main ring 31. Main ring 31 is an annular grooved hollow ring similar to that of the embodiment of FIGS. 1-4. A sewing ring 36 is shown being connected to the heart 37.

Figure 6:
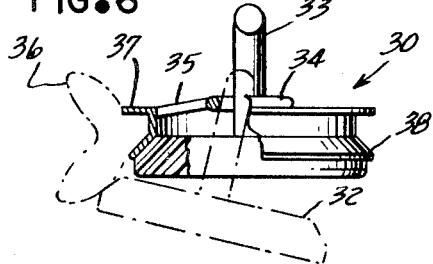
FIG. 6 is a side elevation of the structure shown in FIG. 5 with parts broken away and shown in sections.

FIG. 6 shows the valve of FIG. 5 in a side elevation and having a generally lenticular-shaped pocket for check 32 for the T-shaped protrusion 33 in open position, with the protrusion 33 being held by ring 34 and which may be seated in the seat portion of ring 38 of ring 31. The sewing ring 36 may be made of Teflon, dacron, or other material inert to blood and similarly the frames of the valve can be made of an inert but strong material such as stainless steel while the check elements may be made of plastic and the steel portions may be covered with Teflon, dacron, or the like. Thus, in FIG. 1-7 may be seen that a sturdy aortic and mitral valve prosthesis has been provided to permit more optimum flow through the orifice, and which may have a stainless steel frame with a silastic check or valve element in which the stainless steel frame may be coated with suitable plastic materials which are inert with respect to blood and which similarly may be provided with sewing rings as illustrated for attaching the valve into the heart and the flexible shaft of the check element may be readily removed while the fixed portion is being sutured in place and yet be easily replaceable afterwards. It will of course be clear variations in material are contemplated without departing from the spirit and scope of the present invention.

Figure 7:
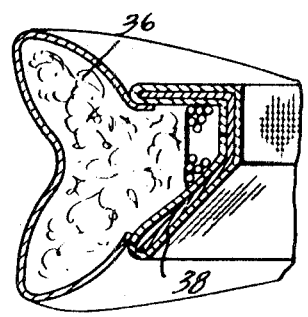
FIG. 7 is an enlarged sectional view taken on the line 7—7 of FIG. 5 illustrating the method used to cover the valve structure with fabric and attaching the valve to the heart.

Referring now to FIG. 8, a flow diagram illustrating the method of manufacturing a mitral valve as illustrated in FIGS. 5, 6 and 7 is shown in which a solid rod of stainless steel 316 of suitable diameter has portions removed 40 as more clearly shown in FIG. 9 in which a groove 41 has been cut on one end of the stainless steel bar 42 by means of a lathe, or the like. Drilling operation 43 is for drilling holes illustrated at 44 (FIG. 9) which hole is to become the small ring 45 opening. The step of parting 46 is illustrated by dash lines 47 in which the end portion of rod 42 is removed by means of a parting tool, or the like. The remaining ring is then mounted on a chuck which is transferred to a milling machine for the milling step 48 for removing the material to produce a mitral frame for the valve 50. Finally, the finishing operation includes filing out the lesser ring, radiusing the corners and polishing the ring 50 as illustrated by the finishing step 51. The silastic check element or poppet valve is produced, such as by molding to the shape as illustrated in FIG. 6 which is sufficiently elastic to be bent and slipped through the ring 45. Also the frame as shown in FIG. 10 after polishing may be completely coated with material such as Teflon. This coating operation would normally require curing the material depending upon the particular material used. The valve also requires a sewing ring to be attached with ring may also be Teflon and which is fixedly attached to the ring 50 for attachment to a heart, or the like.

Referring now to FIGS. 11-14, the method of manufacturing a valve is illustrated in FIGS. 1-4 as illustrated, in which a piece of material such as 18 gauge stainless steel 316 of flat or sheet stock 60 is stamped at 61 of the flow diagram (FIG. 11) to the shape of the dashed lines 62 of FIG. 12; pressing 63 is shown in FIG. 13 in which the center ring which is to form the valve seat is shaped in the press so as to have the appropriate annular groove and seat for the check element. Press 64 is generally shown, pressing stamped portion 62. All angles are then radiused and the bending 65 bends the arms to the shape of the valves 66 (FIG. 14). The step of finishing 67 includes polishing the unit, coating with Teflon, or the like, if desired, attaching a sewing ring, forming a check valve element as shaped as has been previously described, such as by a molding process, and inserting the check element in the frame 66 with each of the protrusions passing through the small rings. This is easily accomplished because of the flexibility of material used for the check valve portion.

FIG. 15 illustrates yet another preferred embodiment for producing a prosthetic cardiac heart valve for replacement of a diseased aortic valve in a flow diagram while FIGS. 16-21 illustrate steps in the process of FIG. 15. Thus, a stainless steel tubing 70 of suitable diameter and wall thickness is cut to a suitable length in the cutting process 71 and as illustrated by the dotted lines 72 in FIG. 16. A steel die is then introduced into the length of tubing which has been cut, which die may consist of two parts 74 which are inserted from each end of the cut tubing 70, and each which die will have an annular waist 75 which when brought together form the shape of the annular ring for the final heart valve frame. The cutoff tubing 70 and dies 74 are then placed in a chuck of a lathe and supported in the tail stock by a live center. A shaping wheel 76 is lined up on the tool post opposite the waist 75 of the die 74. The tubing is heated in step 78 by torch 77, or the like, by use of a small flame while turning the pipe 70 in lathe slowly. Shaping wheel 76 may then be advanced against the heated area until the tubing has acquired the same shape as the waist 75 or the die 74. The tubing and the die may then be removed from the lathe and the die removed from the tubing. The shaping is illustrated at 80 of FIG. 15 and the tubing is shown with its appearance at this point in FIG. 18. Portions of this tubing are then removed at 81, as illustrated by the hatched areas 82 in FIG. 18 which may be accomplished by means of a bandsaw cutting the shaded areas away and producing material shaped as in FIG. 19. Drilling 83 takes place for drilling a pair holes 84 and extending arms 85 which have material removed therefrom to illustrate the shape shown by the dotted lines in the arms 85. The annular grooved ring 86 is also shown. The bending 87 of arms 85 to where the small guide rings 88 are aligned with an axis 90 which axis is also the center axis of the main ring 86. Finishing operations may include radiusing all edges and polishing to a high polish. It may also include coating the frame with material such as Teflon, if desired, in finishing operation 91.

Finally, a check element may be formed with a silastic material such as by molding which is sufficiently flexible that its arms 92 will fit through the guide rings 90 as shown in FIG. 21, as has previously been described and illustrated.

It will be clear at this point that preferred methods of manufacturing prosthetic cardiac heart valves for replacement of diseased aortic and mitral valves have been provided that these methods are not to be construed as limited to the particular embodiments disclosed since variations such as in materials are contemplated in accordance with the best current technology at the time the valves are manufactured. Thus, this invention is not to be construed as limited to the particular forms disclosed herein since these are to be regarded as illustrative rather than restrictive.

I claim:

1. A method of making a prosthetic cardiac valve for replacement of diseased valves comprising the steps of:
    a. Cutting metal tubing to a predetermined length;
    b. inserting a die in each end of said cut tubing;
    c. shaping an annular groove in said cut tubing between the ends thereof in accordance with said dies inserted therein;
    d. removing portions of the tubing walls of said cut and shaped tubing to form at least one arm having a guide ring on the end thereof; each said arm extending to one side of said annular groove;
    e. bending said arm to align the approximate center of said guide ring with the approximate center axis of said cut and shaped tubing to complete a valve frame;
    f. forming a valve element of a flexible material having at least one protrusion extending therefrom; and
    g. inserting each said protrusion through one said guide ring to produce a heart valve.

2. The method in accordance with claim 1 but including the step of attaching a sewing ring to said annular groove.

3. The method in accordance with claim 2 but including the step of polishing said valve frame.

4. The method in accordance with claim 3 but including the step of coating said valve frame.

5. The method in accordance with claim 4 in which the step of removing portions of the tubing walls includes drilling guide ring holds in each such arm.

6. The method in accordance with claim 5 in which said step of removing portions of the tubing walls includes forming a pair of arms one extending perpendicular from each side of said annular groove and each arm having a guide ring on its extremity and said valve element has a pair of protrusions extending in opposite directions for the main valve element body, one protrusion being inserted into each of said pair of guide rings.

7. The method in accordance with claim 6 in which said step of cutting metal tubing is cutting stainless steel tubing.

8. The method in accordance with claim 7 in which said step of coating includes coating said valve frame with Teflon.

9. A method for making a prosthetic cardiac valve for replacement of diseased valves comprising the steps of:
    a. Removing portions of metal from a solid metal bar to form a hollow annular groove on one end of said metal;
    b. drilling a bore along the axis of the hollow annular groove;
    c. parting the end of said material having the annular groove;
    d. milling the parted piece of material to form an annular grooved ring with an arm extended therefrom; said arm having a guide ring formed around said drilled bore and aligned with the said axis of said grooved ring to form a valve frame;
    e. polishing said valve frame;
    f. forming a valve element of a flexible material having a T-shaped protrusion therefrom; and
    g. inserting said T-shaped protrusion through said grooved ring and through said guide ring, producing a heart valve.

10. The method of making a prosthetic cardiac valve in accordance with claim 9 but including the step of radiusing corners following the step of milling the parted pieces of material.

11. The method in accordance with claim 10 in which said valve element is generally lenticular shaped with a T-shaped protrusion extending from the center thereof.

12 The method according to claim 11 in which said step of removing portions of metal from a solid metal bar is removing metal from a stainless steel bar.

13. The method according to claim 12 but including the step of coating said valve frame with Teflon.

14. The method in accordance with claim 13 but including the step of attaching a sewing ring to said annular groove for attaching said valve to a heart.

15. A method of making a prosthetic cardiac valve for replacement of diseased valves comprising the steps of:
  a. Stamping a main ring having at least one extending arm therefrom with a guide ring through the extremities of each said arm from a metal sheet;
  b. pressing an annular groove and a valve seat into said main ring;
  c. bending each said arm to align each said guide ring center with the center of said main ring thereby forming a heart valve frame;
  d. polishing said frame;
  e. forming a check element adapted to fit in said seat and having at least one protrusion therefrom;
  f. inserting each said protrusion into one said guide ring to produce a heart valve.

16. The method in accordance with claim 15 but including the step of radisuing all corners of said valve frame.

17. The method in accordance with claim 16 but including the step of attaching a sewing ring to said valve frame for sewing said valve into a heart.

18. The method in accordance with claim 17 in which said stamping a main ring having at least one extending arm has a pair of extending arms extending in opposite directions, each said arm having a guide ring at its extremity.

19. The method in accordance with claim 18 but including the step of coating said valve frame with Teflon.

20 The method in accordance with claim 19 in which the step of stamping from sheet metal includes stamping from a sheet of stainless steel.

21. The method in accordance with claim 17 in which said stamping step includes stamping one extending arm having a guide ring on the end thereof and said forming a check element includes forming a lenticular-shaped check element with a single T-shaped protrusion.

22. The method in accordance with claim 21 in which said step of inserting said protrusion includes inserting said T-shaped protrusion through said main ring and said guide ring, said guide ring movably holding said check element to the valve frame.